United States Patent
Saito et al.

(10) Patent No.: US 10,436,305 B2
(45) Date of Patent: Oct. 8, 2019

(54) BELT-DRIVEN CONTINUOUSLY VARIABLE TRANSMISSION

(71) Applicant: TOYOTA JIDOSHA KABUSHIKI KAISHA, Toyota-shi, Aichi-ken (JP)

(72) Inventors: Tatsuya Saito, Gotemba (JP); Naoyuki Shibata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 379 days.

(21) Appl. No.: 15/371,769

(22) Filed: Dec. 7, 2016

(65) Prior Publication Data

US 2017/0167594 A1 Jun. 15, 2017

(30) Foreign Application Priority Data

Dec. 9, 2015 (JP) .................................. 2015-240020

(51) Int. Cl.
*F16H 57/00* (2012.01)
*F16H 9/16* (2006.01)

(52) U.S. Cl.
CPC ........... *F16H 57/0006* (2013.01); *F16H 9/16* (2013.01)

(58) Field of Classification Search
CPC ........ F16H 7/18; F16H 9/18; F16H 2007/185; F16H 9/24; F16H 57/0489
USPC ................................................. 474/140, 111
See application file for complete search history.

(56) References Cited

U.S. PATENT DOCUMENTS

| | | | |
|---|---|---|---|
| 6,435,994 B1 * | 8/2002 | Friedmann | F16H 7/18 474/111 |
| 7,354,364 B2 * | 4/2008 | Glas | F16H 59/36 474/140 |
| 8,057,336 B2 * | 11/2011 | Wodtke | F16H 7/18 474/111 |
| 8,376,883 B2 * | 2/2013 | Inoue | F16H 9/24 474/109 |
| 9,382,982 B2 * | 7/2016 | Werny | F16H 7/18 |
| 9,458,916 B2 * | 10/2016 | Garcia | F16H 7/18 |
| 9,765,857 B2 * | 9/2017 | Werny | F16H 7/18 |
| 9,777,808 B2 * | 10/2017 | Urbanek | F16H 7/18 |
| 9,933,052 B2 * | 4/2018 | Penner | F16H 7/18 |
| 2004/0142792 A1 * | 7/2004 | Glas | F16H 59/36 477/70 |
| 2005/0277500 A1 * | 12/2005 | Bitzer | F16H 57/0489 474/1 |

(Continued)

FOREIGN PATENT DOCUMENTS

| | | |
|---|---|---|
| JP | 2011-112155 A | 6/2011 |
| JP | 2013-007438 A | 1/2013 |

*Primary Examiner* — Henry Y Liu

(74) *Attorney, Agent, or Firm* — Hunton Andrews Kurth LLP

(57) ABSTRACT

A belt-driven continuously variable transmission in which a collision noise of a broken chain belt can be suppressed is provided. In the transmission, a chain belt is applied to belt grooves of pulleys to transmit power therebetween, and a speed ratio is varied by changing a width of the belt groove of at least one of pulleys. The transmission comprises: a guiderail that is contacted to the chain belt to suppress vibrations in the chain belt and that is allowed to rotate with a change in an inclination of the chain belt; and a pushing mechanism that applies a load to the guiderail to rotate the guiderail to alter an inclination of the chain belt in a direction to increase the speed ratio when the chain belt is broken.

9 Claims, 7 Drawing Sheets

(56) References Cited

U.S. PATENT DOCUMENTS

| | | | | |
|---|---|---|---|---|
| 2007/0190830 A1* | 8/2007 | Wodtke | ............... | F16H 7/18 |
| | | | | 439/153 |
| 2011/0152019 A1* | 6/2011 | Gantner | ............... | F16H 9/24 |
| | | | | 474/8 |
| 2011/0244999 A1* | 10/2011 | Nakamura | ............... | F16H 9/18 |
| | | | | 474/91 |
| 2014/0235390 A1* | 8/2014 | Urbanek | ............... | F16H 7/18 |
| | | | | 474/140 |
| 2015/0176684 A1* | 6/2015 | Werny | ............... | F16H 7/18 |
| | | | | 474/140 |
| 2016/0201790 A1* | 7/2016 | Shibata | ............... | F16H 9/18 |
| | | | | 474/8 |
| 2016/0238111 A1* | 8/2016 | Penner | ............... | F16H 7/18 |

* cited by examiner

BELT-DRIVEN CONTINUOUSLY VARIABLE TRANSMISSION

CROSS REFERENCE TO RELATED APPLICATIONS

The present application claims the benefit of priority to Japanese Patent Application No. 2015-240020 filed on Dec. 9, 2015 with the Japanese Patent Office, the entire contents of which are incorporated herein by reference in its entirety.

BACKGROUND

Field of the Disclosure

Embodiments of the present application relates to the art of a belt-driven continuously variable transmission using a chain belt.

Discussion of the Related Art

JP-A-2013-7438 describes a continuously variable transmission comprising an input pulley rotated by a power of a prime mover, an output pulley transmitting the power to an output side of a powertrain, and a chain running between those pulleys. In the continuously variable transmission taught by JP-A-2013-7438, a speed ratio may be varied infinitely by changing widths of chain grooves of the pulleys. According to the teachings of JP-A-2013-7438, in order to suppress string vibrations of the chain belt, a guide rail is arranged between the pulleys in a pivotal manner with respect to a pin.

However, if the chain belt breaks in the continuously variable transmission taught by JP-A-2013-7438, the broken chain may collide against a casing of the transmission to generate intense noise. For example the broken chain may be centrifugally cast off the pulley and collide against the casing. In this case, a crash impact of the broken chain is increased if a rotational speed of the pulley is fast. Alternatively, one end of the broken chain may be caught in the pulley and the other end of the broken chain may flap to collide against the casing repeatedly. In this case, the broken chain may be caught easily by the pulley in which a running diameter of the chain groove is smaller.

SUMMARY

Aspects of the present application have been conceived noting the foregoing technical problems, and it is therefore an object of the present application is to provide a belt-driven continuously variable transmission in which a collision noise of a broken chain belt can be suppressed.

The embodiment of the present application relates to a belt-driven continuously variable transmission comprising: a primary pulley; a secondary pulley; a chain belt applied to belt grooves of the primary pulley and a secondary pulley to transmit power therebetween; and a guiderail that is contacted to a straight portion of the chain belt running between the primary pulley and the secondary pulley to suppress vibrations in the chain belt and that is allowed to rotate with a change in an inclination of the straight portion of the chain belt. A speed ratio of the belt-driven continuously variable transmission may be varied by changing a width of the belt groove of the pulley. In order to achieve the above-explained objective, the belt-driven continuously variable transmission is provided with a pushing mechanism that applies a load to the guiderail to rotate the guiderail to alter an inclination of the straight portion of the chain belt in a direction to increase the speed ratio when the chain belt is broken.

In a non-limiting embodiment, the pushing mechanism may include a spring member that applies an elastic force to the guiderail to rotate the guiderail to alter an inclination of the straight portion of the chain belt in a direction to increase the speed ratio.

In a non-limiting embodiment, the straight portion may include a first straight portion and a second straight portion. Specifically, a tension in the first straight portion is higher than that in the second straight portion, and an elastic force of the spring member may be applied to the guiderail contacted to the first straight portion.

In a non-limiting embodiment, an elastic force of the spring member may be applied to the guiderail contacted to the second straight portion.

In a non-limiting embodiment, the spring member may be individually contacted to the guiderail contacted to the first straight portion and the guiderail contacted to the second straight portion to apply an elastic force to each of the guiderail.

In a non-limiting embodiment, the pushing mechanism may include an actuator unit that rotates the guiderail to alter an inclination of the straight portion of the chain belt in a downshifting direction to increase the speed ratio when the chain belt is broken.

In a non-limiting embodiment, the pushing mechanism may include an actuator system that rotates the guiderail to alter an inclination of the straight portion of the chain belt in a downshifting direction to increase the speed ratio, and a controller that determines a breakage of the chain belt and controls the actuator system. In addition, the controller may be configured to actuate the actuator system to rotate the guiderail to alter an inclination of the straight portion of the chain belt in a direction to increase the speed ratio when the chain belt is broken.

In a non-limiting embodiment, the actuator unit and the actuator system may be adapted to rotate the guiderail contacted to the first straight portion in a downshifting direction to increase the speed ratio.

Thus, according to the embodiment of the present application, a guiderail is arranged along the straight portion of the chain belt to be contacted to the chain belt to suppress vibrations of the chain belt while being allowed to rotate with a change in an inclination of the straight portion of the chain belt. When the chain belt is broken the guiderail is rotated by the pushing mechanism to alter an inclination of the straight portion of the chain belt in a direction to increase the speed ratio. A collision impact and a collision frequency of the broken chain belt against a casing are increased with a reduction in the speed ratio of the transmission. In order to reduce the collision impact of the broken chain belt against the casing, according to the embodiment of the present application, the guiderail is inclined to alter the inclination of the broken chain belt in the direction to increase the speed ratio of the transmission. According to the embodiment, therefore, collision noise resulting from breakage of the chain belt can be suppressed.

As described, the guiderail is allowed to rotate with a change in an inclination of the straight portion of the chain belt. That is, a pivotal movement of the guiderail is restricted by the straight portion of the chain belt. According to the embodiment, an elastic force of the coil spring as the pushing mechanism is applied to the guiderail to push the guiderail in a direction to incline the straight portion of the chain belt to increase a speed ratio of the transmission. According to the embodiment, therefore, the guiderail will be free from a binding force of the chain belt so that the guiderail can be rotated by the spring member when the chain belt is broken so as to alter an inclination of the straight portion of the chain belt in a direction to increase the speed ratio.

The chain belt may be broken easily at a highly tensioned portion. According to the embodiment, the elastic force of the spring member may be applied to the guiderail contacted to the first straight portion in which the tension is higher. According to the embodiment therefore, an inclination of the first straight portion of the broken chain belt may be altered certainly in the direction to increase a speed ratio of the transmission:

Specifically, a speed ratio of the transmission is changed by varying running diameters of the chain belt in the belt grooves of the pulleys. That is, a speed ratio of the transmission is changed by changing entrance points of the straight portions of the chain belt into the belt grooves of the pulleys. However, since the tension in, the second straight portion is lower than that in the first straight portion, the entrance point of the second straight portion into the belt groove, is easier to be changed. According to the embodiment, the spring member may also be arranged to push the guiderail contacted to the second straight portion. According to the embodiment, therefore, a load of the coil spring may be always applied to the second straight portion of the chain belt so that a downshifting of the transmission can be executed promptly.

According to the embodiment, moreover, the spring member may also be contacted to each of the guiderail contacted to the first straight portion and the guiderail contacted to the second straight portion to apply an elastic, force to each of the guiderail. According to the embodiment, therefore, a response of downshifting can be enhanced in the normal condition, and the inclination of the straight portion of the chain belt can be altered in the direction to increase the speed ratio when the chain belt is broken.

According to another aspect of the embodiment, the guiderail may be rotated by the actuator unit to alter an inclination of the straight portion of the chain belt in a downshifting direction to increase the speed ratio when the chain belt is broken. In this case, a load to rotate the guiderail is applied to the guiderail only when the chain belt is broken. However, in the normal condition, the guiderail and the chain belt are not subjected to a load to incline the chain belt in the downshifting direction. According to another aspect of the embodiment, therefore, a friction loss between the chain belt and the guiderail can be reduced in the normal condition.

Optionally, a breakage of the chain belt may be detected accurately by the controller, and when a breakage of the chain belt is detected by the controller, the actuator system is actuated by the controller to rotate the guiderail to alter the inclination of the chain belt in the downshifting direction. In this case, a load to rotate the guiderail is also applied to the guiderail only when the chain belt is broken but the guiderail and the chain belt are not subjected to the load to rotate the guiderail in the normal condition. In this case, therefore, a friction loss between the chain belt and the guiderail may also be reduced in the normal condition. In addition, the breakage of the chain belt can be detected certainly by the controller and hence an inclination of the broken chain belt may be altered certainly in the downshifting direction.

Thus, according to another aspect of the embodiment, the guiderail contacted to the first straight portion may be rotated by the actuator unit or the actuator system in the downshifting direction. According to another aspect of the embodiment, therefore, an inclination of the first straight portion may be altered certainly in the downshifting direction to increase the speed ratio when the chain belt is broken.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
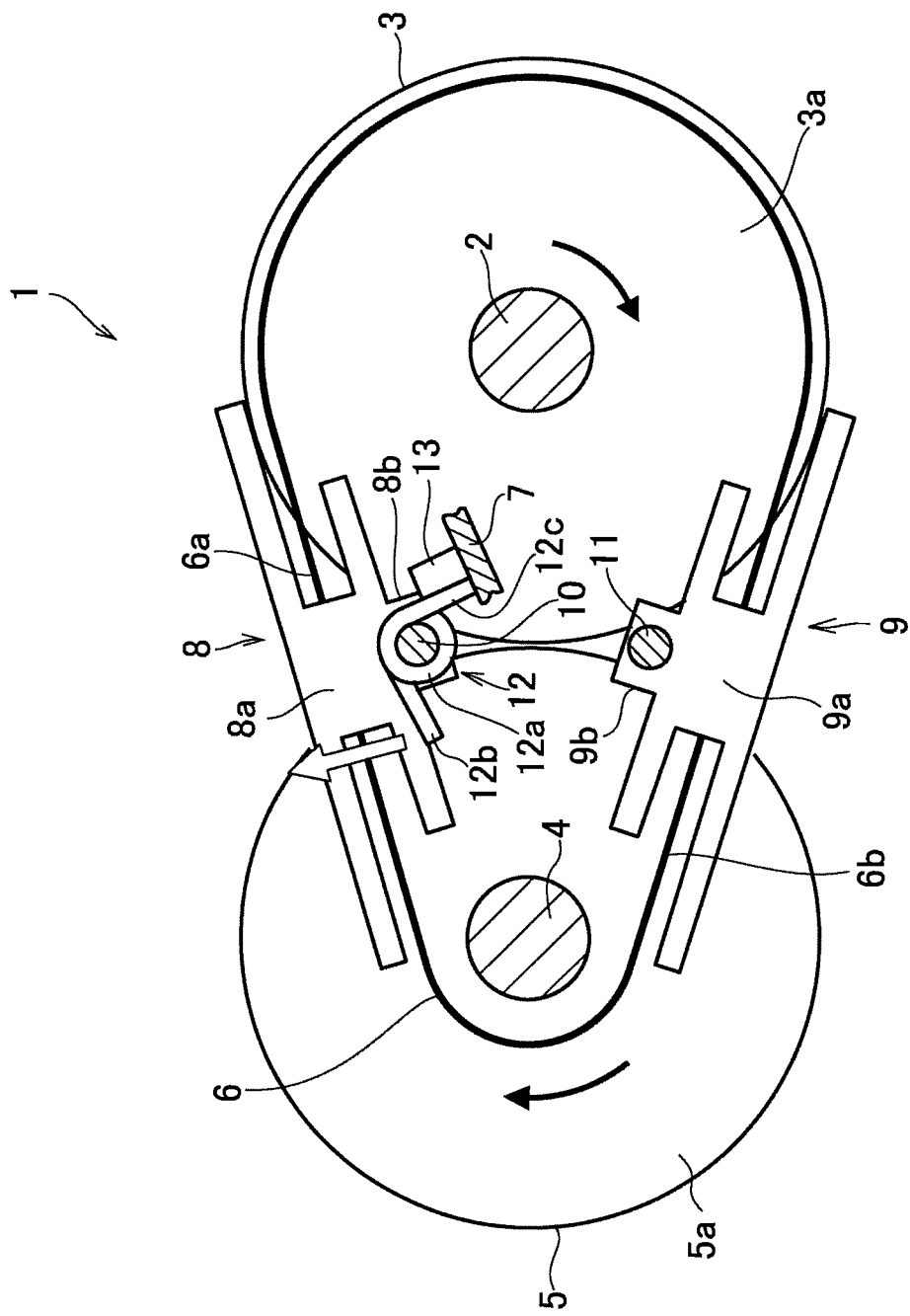
FIG. 1 is a schematic illustration showing one embodiment of the belt-driven continuously variable transmission in which the chain belt runs properly.
Figure 2:
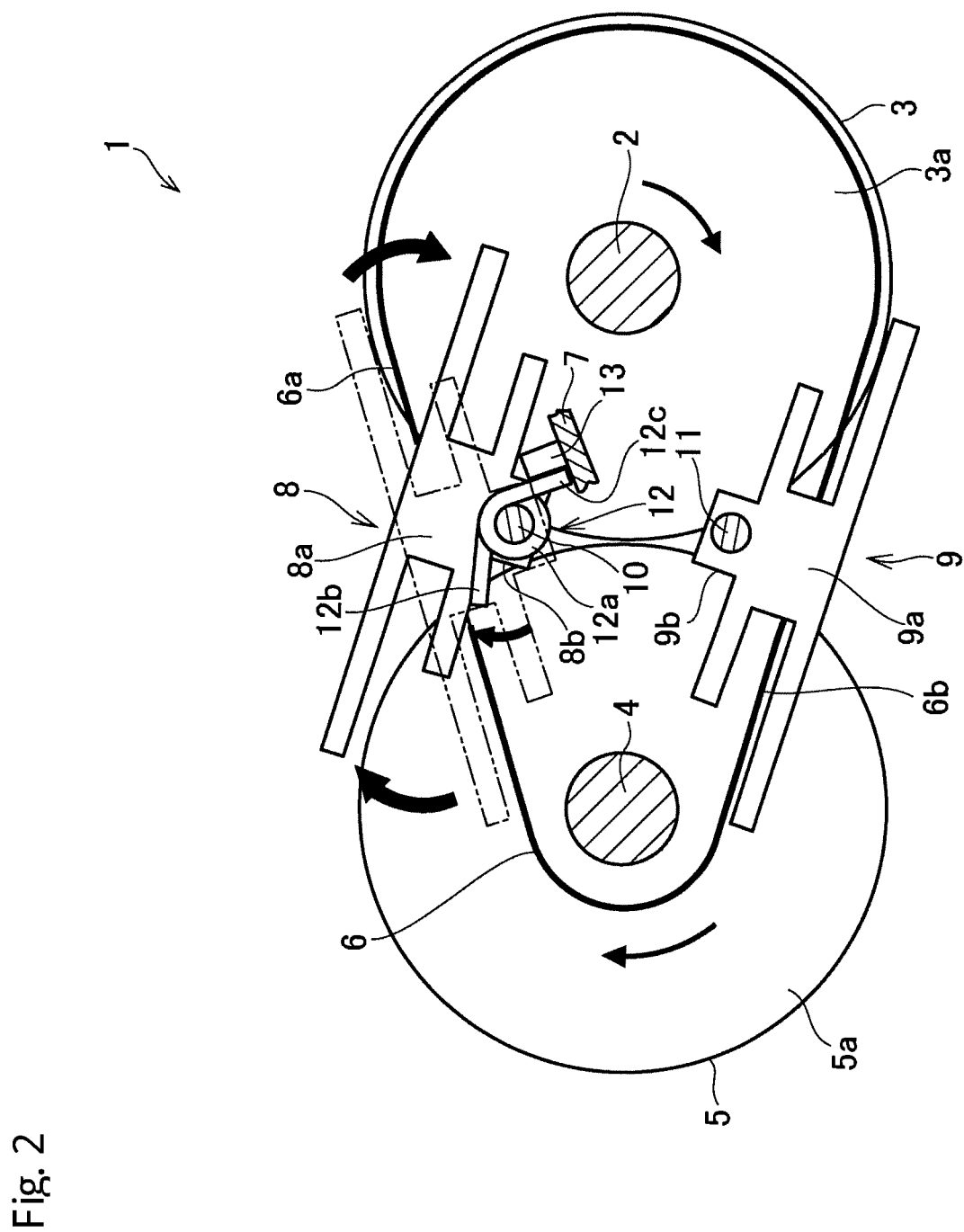
FIG. 2 is a schematic illustration showing one embodiment of the belt-driven continuously variable transmission in which the chain belt is broken.

Preferred embodiments of the present application will now be explained with reference to the accompanying drawings. The embodiment of the present application may be applied to a conventional vehicular belt-driven continuously variable transmission having a chain belt as taught e.g., by JP-A-2013-7438. Referring now to FIGS. 1 and 2, there are schematically shown a preferred embodiment of the belt-driven continuously variable transmission (to be abbreviated as the "CVT" hereinafter) 1 according to the present application. In the CVT 1, an input shaft 2 rotated by a torque of a prime mover (not shown) and an output shaft 4 transmitting the torque to an output member such as a driveshaft (not shown) are arranged parallel to each other in a casing 7. A primary pulley 3 is fitted onto the input shaft 2 to be rotated integrally therewith, and a secondary pulley 5 is fitted onto the output shaft 4 to be rotated integrally therewith. As explained later, the primary pulley 3 has a belt groove 3a and the secondary pulley 5 has a belt groove 5a, and a chain belt 6 is applied to the belt groove 3a and the belt groove 5a.

Specifically, the primary pulley 3 comprises a fixed sheave (not shown) formed integrally with the input shaft 2, and a movable sheave (not shown) splined onto the input shaft 2 in such a manner as to rotate integrally therewith while being allowed to axially reciprocate thereon. The fixed sheave and the movable sheave of the primary pulley 3 have inwardly facing conical surfaces, and the belt groove 3a is formed between the conical surfaces. The movable sheave is actuated by an actuator (not shown) to reciprocate on the input shaft 2.

Likewise, the secondary pulley 5 also comprises a fixed sheave (not shown) formed integrally with the output shaft 4, and a movable sheave (not shown) splined onto the output shaft 4 in such a manner as to rotate integrally therewith while being allowed to axially reciprocate thereon. The fixed sheave and the movable sheave of the secondary pulley 5 also have inwardly facing conical surfaces, and the belt groove 5a is formed between the conical surfaces. The movable sheave of the secondary pulley 5 is also actuated by an actuator (not shown) to reciprocate on the output shaft 4.

Specifically, the chain belt 6 is formed by connecting a plurality of layers of plate-like links by pins (neither of which are shown) in a circular manner, and applied to the belt groove 3a of the primary pulley 3 and the belt groove 5a of the secondary pulley 5 to transmit power therebetween.

Thus, in the CVT 1, power is transmitted between the primary pulley 3 and the secondary pulley 3 through the chain belt 6. For example, a speed ratio of the CVT 1 is varied by chaining a width of the belt groove 3a of the primary pulley 3 by the hydraulic actuator to alter an effective running diameter of the chain belt 6 running therein. Consequently, since a circumferential length of the chain belt 6 will not be changed, a width of the belt groove 5a of the secondary pulley 5 is changed with a change in the width of the belt groove 3a of the primary pulley 3, that is, with a change in the effective running diameter of the chain belt 6 in the belt groove 3a. In this situation, a belt clamping pressure applied to the secondary pulley 5 is adjusted by the hydraulic actuator in such a manner as to avoid slippage of the chain belt 6 in the belt groove 5a.

In order to suppress vibrations of the chain belt 6, in the CVT 1, a first guiderail 8 is arranged to guide a first straight portion 6a of the chain belt 6, and a second guiderail 9 is arranged to guide a second straight portion 6b of the chain belt 6. Specifically, when the primary pulley 3 is rotated in the forward direction (i.e., clockwise in FIGS. 1 and 2) to transmit torque, the first straight portion 6a is tensed and the second straight portion 6b is loosen. That is, when the primary pulley 3 is rotated in the forward direction to transmit torque, a tension in the first straight portion 6a is higher than that in the second straight portion 6b.

The first guiderail 8 comprises a guide member 8a and a base portion 8b. The guide member 8a extends along an outer surface off the first straight portion 6a of the chain belt 6 and hence the first straight portion 6a comes into contact to the guide member 8a when vibrated. The base portion 8b is formed integrally with the guide member 8a, and the first, guiderail 8 is pivotally supported by a first shaft 10 of the casing 7 inserted into a shaft hole (not shown) formed on the base portion 8b.

Likewise, the second guiderail 9 comprises a guide member 9a and abase portion 9b. The guide member 9a extends along an outer surface of the second straight portion 6b of the chain belt 6 and hence the second straight portion 6b comes into contact to the guide member 9a when vibrated. The base portion 9b is formed integrally with the guide member 9a, and the second guiderail 9 is pivotally supported by a second shaft 11 of the casing 7 inserted into a shaft hole (not shown) formed on the base portion 9b.

Thus, if the running chain belt 6 meanders or waves, the chain belt 6 comes into contact to the first guiderail 8 and the second guiderail 9 so that vibrations and noises of chain belt 6 can be suppressed. In this situation, since the first guiderail 8 and the second guiderail 9 are individually supported in a pivotal manner, the chain belt 6 is allowed to run smoothly. Nonetheless, a pivotal movement of each of the first guiderail 8 and the second guiderail 9 is individually restricted by the first straight portion 6a and the second straight portion 6b of the chain belt 6.

In the CVT 1, collision noise of a chain belt 6 can be suppressed even if the chain belt 6 is broken. To this end, a pushing mechanism for rotating at least one of the first guiderail 8 and the second guiderail 9 is attached to the first shaft 10 or the second shaft 11. In the embodiment shown in FIGS. 1 and 2, specifically, a torsion coil spring 12 is fitted onto the first shaft 10 to push the first guiderail 8 in a direction to rotate the first guiderail 8 clockwise.

Specifically, a coil portion 12a of the coil spring 12 is fitted onto the first shaft 10 supporting the first guiderail 8. One of arm portions 12b of the coil spring 12 is contacted to the base portion 8b of the first guiderail 8 and the other arm portion 12c of the coil spring 12 is contacted to a stopper 13 of the casing 7 so that the coil spring 12 is compressed inwardly. That is, an elastic force of the coil spring 12 is applied, to the first guiderail 8 by the arm portion 12b to push the first guiderail 8 in a direction to incline the guide member 8a at an inclined angle of the first straight portion 6a of a case in which a speed ratio of the CVT 1 is increased to a maximum ratio (i.e., clockwise in FIGS. 1 and 2). In other words, the first straight portion 6a of the chain belt 6 is pushed by the first guiderail 8 in a direction to increase the running diameter of the chain belt 6 in the secondary pulley 5, that is, to increase the speed ratio of the CVT 1. When the chain belt 6 is broken, specifically, the first guiderail 8 will be free from a binding force of the chain belt 6 and hence rotated clockwise (i.e., in a downshifting direction) by the UM portion 12b of the coil spring 12 as illustrated in FIG. 2. According to the embodiment, therefore, a collision impact of the broken chain belt 6 against the casing can be mitigated.

Alternatively, the torsion coil spring 12 serving as the pushing mechanism may also be arranged only on the second shaft 11 of the casing 7 to push the guide member 9a of the second guiderail 9 in the direction to increase a speed ratio of the CVT 1. In this case, therefore, the second straight portion 6b of the chain belt 6 is pushed radially outwardly by the second guiderail 9, and when the chain belt 6 is broken, the second guiderail 9 is rotated counterclockwise in FIGS. 1 and 2 by the second guiderail 9 to mitigate a collision impact of the broken chain belt 6 against the casing 7.

As described, a speed ratio of the CVT 1 is changed by varying the running diameters of the chain belt 6 in the belt groove 3a of the primary pulley 3 and the belt groove 5a of the secondary pulley 5. That is, a speed ratio of the CVT 1 is changed by changing an entrance point of the first straight portion 6a of the chain belt 6 into the belt groove 3a of the primary pulley 3 and an entrance point of the second straight portion 6b of the chain belt 6 into the belt groove 5a of the secondary pulley 5. To this end, since the tension in the second straight portion 6b is lower than that in the first straight portion 6a, the entrance point of the second straight portion 6b into the belt groove 5a is easier to be changed. In the case of thus arranging the torsion coil spring 12 only on the second shaft 11, therefore, a load of the coil spring 12 may be always applied to the second straight portion 6b of the chain belt 6 to promptly execute a downshifting of the CVT 1.

Figure 3:
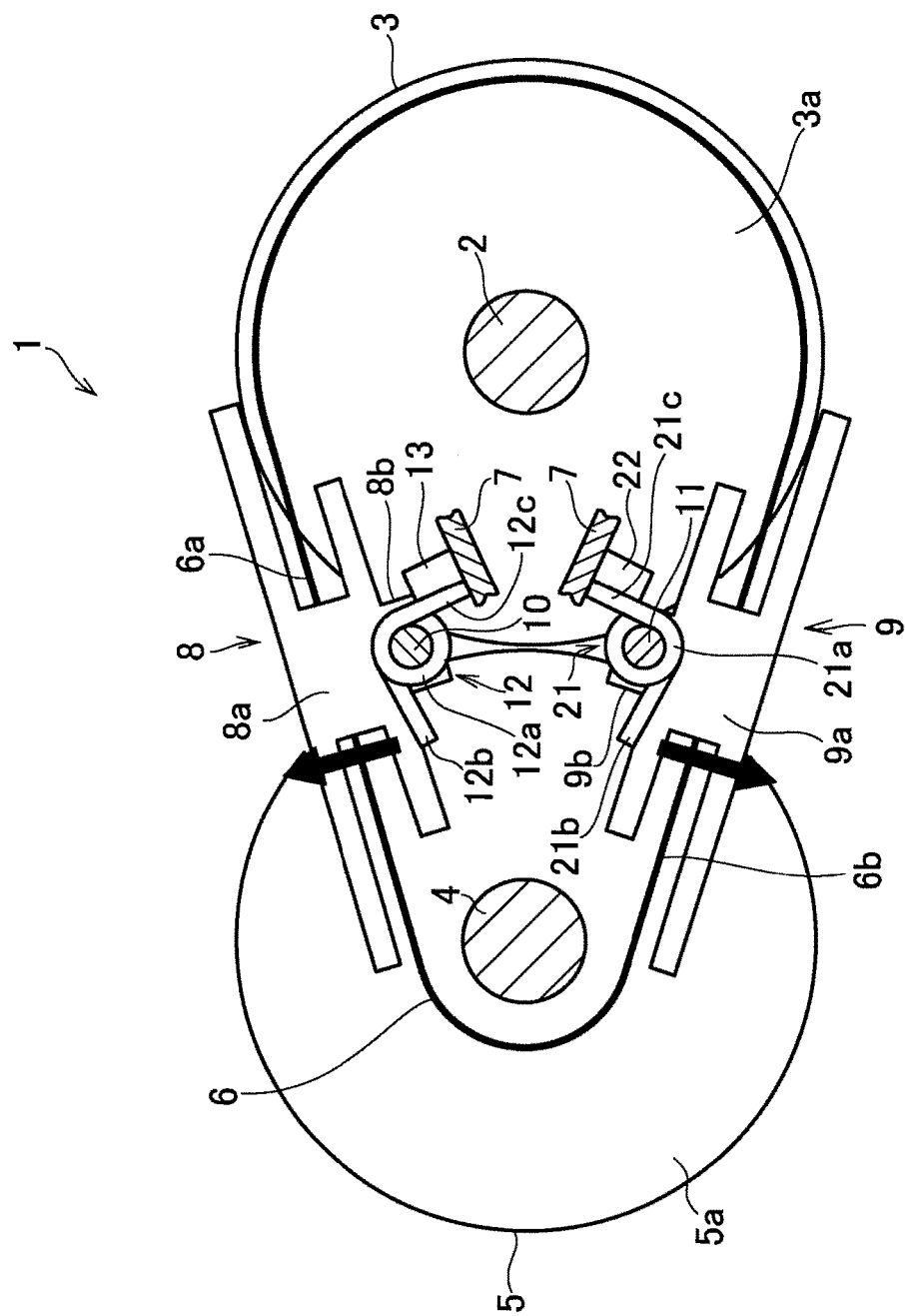
FIG. 3 is a schematic illustration showing an embodiment of the belt-driven continuously variable transmission in which the spring members are arranged to rotate both of the guiderails.

Turning to FIG. 3, there is shown another embodiment in which the coil springs are arranged on both of the first shaft 10 and the second shaft 11 to push the first guiderail 8 and the second guiderail 9 radially outwardly. In the embodiment shown in FIG. 3, specifically, the above-explained coil spring 12 is fitted onto the first shaft 10 as the embodiment shown in FIGS. 1 and 2.

In addition, in the embodiment shown in FIG. 3, a coil portion 21a of a torsion coil spring 21 is fitted onto the second shaft 11 supporting the second guiderail 9. One of arm portions 21b of the coil spring 21 is contacted to the base portion 9b of the second guiderail 9 and the other arm portion 21c of the coil spring 21 is contacted to a stopper 22 of the casing 7 so that the coil spring 21 is compressed inwardly. That is, an elastic force of the coil spring 21 is also applied to the second guiderail 9 by the arm portion 21b to push the second guiderail 9 in a direction to incline the guide member 9a at an inclined angle of the second straight portion 6b of a case in which a speed ratio of the CVT 1 is increased to a maximum ratio (i.e., counterclockwise in FIG. 3). In other words, the second straight portion 6b of the chain belt 6 is pushed by the second guiderail 9 in a direction to increase the running diameter of the chain belt 6 in the secondary pulley 5, that is, to increase the speed ratio of the CVT 1. When the chain belt 6 is broken, the second guiderail 9 will also be free from a binding force of the chain belt 6 and hence rotated in the downshifting direction by the arm portion 21b of the coil spring 21.

Thus, according to the embodiment shown in FIG. 3, the coil springs are arranged to alter inclinations of the broken chain belt 6 in both of the first straight portion 6a and the second straight portion 6b. In most cases, the chain belt 6 is broken at the point where any of the straight portions enters into the belt groove or at a point where any of the straight portions is pulled out of the belt groove. According to the embodiment shown in FIG. 3, therefore, both end portions of the broken chain belt 6 may be guided individually by the first guiderail 8 and the second guiderail 9 in the directions to increase a speed ratio of the CVT 1.

Figure 4A:
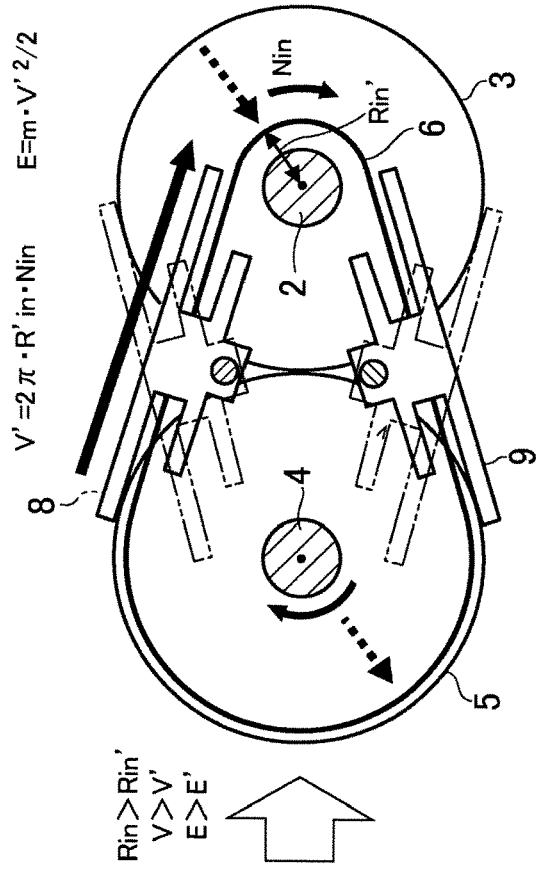
FIG. 4(a) and FIG. 4(b) are explanation drawings showing a velocity and behavior of the broken chain belt.
Figure 4B:
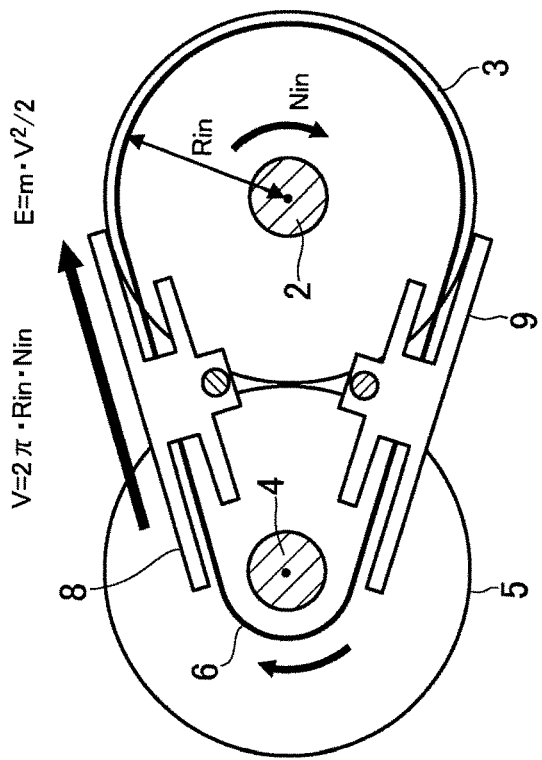

FIG. 4(a) shows a situation in which a speed ratio of the CVT 1 is reduced to a minimum ratio. In this case, a circumferential velocity (i.e., a running speed) V of the chain belt 6 can be expressed as:

$$V=2\pi \cdot Rin \cdot Nin;$$

where Rin is a running diameter of the chain belt 6 in the primary pulley 3 and Nin is a rotational speed of the primary pulley 3. Accordingly, a collision energy E of the chain belt 6 against the casing 7 when the chain belt 6 is broken in the CVT 1 establishing the minimum speed ratio can be expressed as:

$$E=m \cdot V^2/2;$$

where "m" is a mass of the chain belt 6. FIG. 4(b) shows a situation in which a speed ratio of the CVT 1 is increased to a maximum ratio. In this case, a circumferential velocity (i.e., a running speed) V' of the chain belt 6 can be expressed as:

$$V'=2\pi Rin' \cdot Nin;$$

where Rin' is a running diameter of the chain belt 6 in the primary pulley 3 and Nin is a rotational speed of the primary pulley 3. Accordingly, a collision energy of the chain belt 6 against the casing 7 when the chain belt 6 is broken in the CVT 1 establishing the maximum speed ratio can be expressed as:

$$E'=m \cdot V'^2/2.$$

In the case that the speed ratio of the CVT 1 is set to the maximum ratio, the running diameter Rin' of the chain belt 6 is smaller than the running diameter Rin of the case that the speed ratio of the CVT 1 is set to the minimum ratio. Consequently, the circumferential velocity V' of the case in which the speed ratio of the CVT 1 is set to the maximum ratio becomes slower than the circumferential velocity V of the case in which, the speed ratio of the CVT 1 is set to the minimum ratio. That is, the collision energy E' of the case in which the speed ratio of the CVT 1 is set to the maximum ratio is weaker than the collision energy E of the case in which the speed ratio of the CVT 1 is set to the minimum ratio.

Thus, the collision impact of the broken chain belt 6 against the casing 7 is increased with a reduction in the speed ratio of the CVT 1. In order to reduce the collision impact of the broken chain belt 6 against the casing 7, in the foregoing embodiments, the first guiderail 8 (and/or the second guiderail 9) is/are inclined to alter the inclination(s) of the broken chain belt 6 in the direction(s) to increase the speed ratio of the CVT 1. For this reason, collision noise resulting from breakage of the chain belt 6 can be suppressed.

In addition, when the chain belt 6 is broken, one end of the broken chain belt 6 may be caught in the secondary pulley 5 and the other end of the broken chain belt 6 may flap to collide against the casing 7 repeatedly. In the CVT 1, the minimum speed ratio is established more frequently than the maximum speed ratio. That is, the running, diameter of the chain belt 6 is primary pulley 3 is increased to be larger than that in the secondary pulley 5 in most cases. In this situation, if the chain belt 6 is broken, the end portion of the broken chain belt 6 is immediately unwound from the secondary pulley 3 and the other end portion of the broken chain belt 6 is unwound a short time later. For this reason, the broken chain belt 6 may be caught by the secondary pulley 5 rather than the primary pulley 3. However, in the CVT 1 according to the embodiments, the first guiderail 8 (and/or the second guiderail 9) is/are inclined to alter the inclination(s) of the broken chain belt 6 in the secondary pulley 5 in the direction(s) to increase the speed ratio of the CVT 1. According to the embodiments, therefore, the broken chain belt 6 can be prevented from being caught by the secondary pulley 5 so that collision noise resulting from breakage of the broken chain belt 6 can be suppressed.

Figure 5:
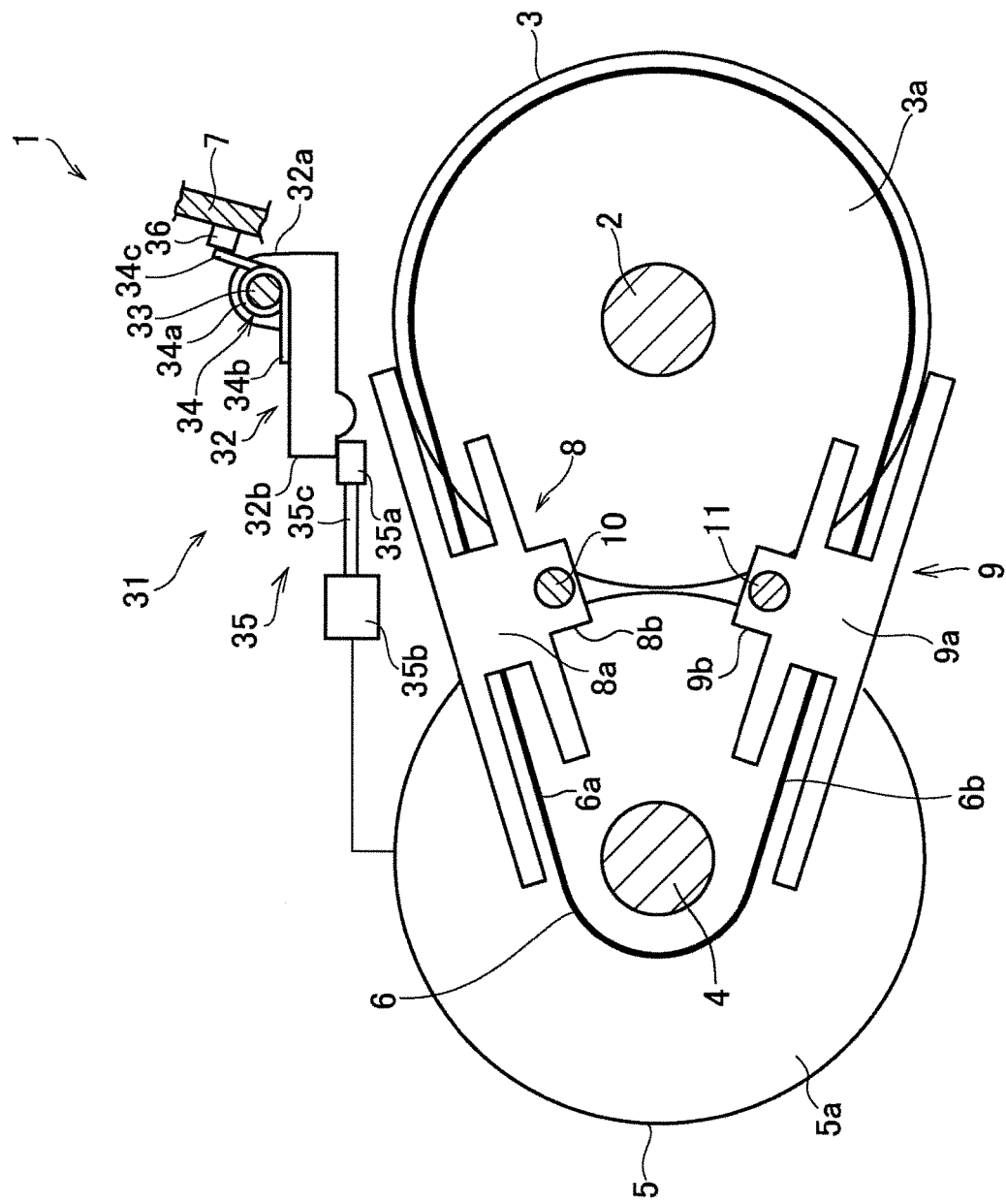
FIG. 5 is a schematic illustration showing an embodiment of the belt-driven continuously variable transmission having the actuator unit to rotate the guiderail when the chain belt is broken.
Figure 6:
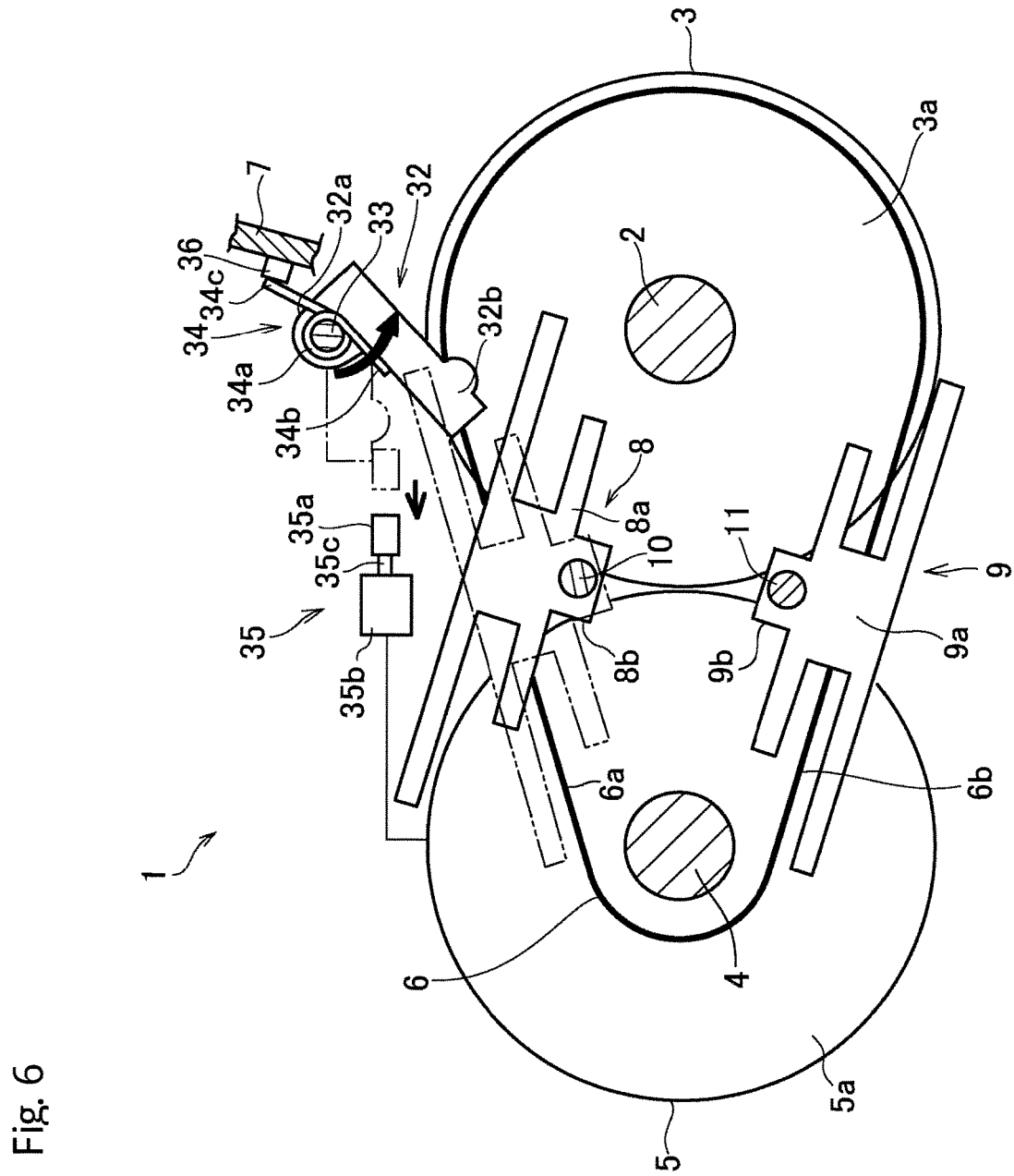
FIG. 6 is a schematic illustration showing a situation in which the chain belt is broken in the belt-driven continuously variable transmission shown in FIG. 5.
Figure 7:
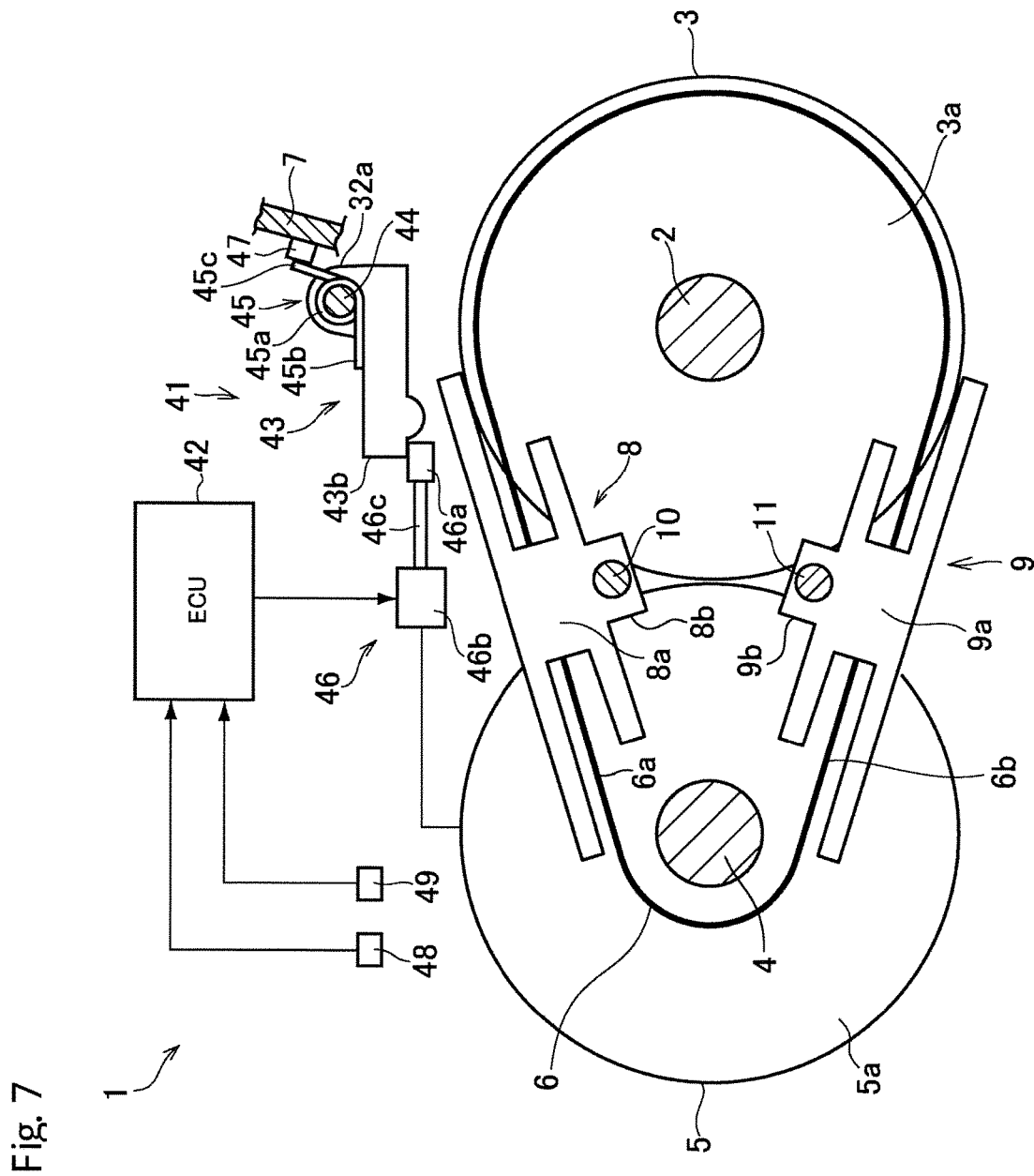
FIG. 7 is a schematic illustration showing an embodiment of the belt-driven continuously variable transmission having the controller for determining a breakage of the chain belt and the actuator system to rotate the guiderail when the chain belt is broken.

Turning to FIGS. 5, 6 and 7, there are shown still another embodiment of the CVT 1 in which the CVT 1 is further provided with an actuator unit for rotating at least one of the first guiderail 8 and the second guiderail 9 in the downshifting direction when the chain belt 6 is broken. According to the embodiment shown in FIGS. 5 and 6, the CVT 1 is provided with an actuator unit 31 that rotates the first guiderail 8 to change an inclination of the first straight portion 6a of the chain belt 6 in the downshifting direction when the chain belt 6 is broken.

The actuator unit 31 comprises a rod 32 as a rod member or a plate member, a shaft 33, a torsion coil spring 34, and an actuator 35. A shaft hole 32a is formed on one end of the rod 32 (in the right side in FIG. 5), and the shaft hole 32a is fitted onto the shaft 33 fixed to the casing 7. Thus, the rod 32 is supported by the casing 7 in a pivotal manner so that a leading end 32b (in the left side in FIG. 5) of the rod 32 is to be brought into contact with the first guiderail 8 when the rod 32 is rotated counterclockwise in FIGS. 5 and 6. In the normal condition, such counterclock rotation of the rod 32 is restricted by a stopper portion 35a of the actuator 35 that is contacted to the leading end 32b of the rod 32. That is, in the normal condition, the leading end 32b of the rod 32 is isolated from the first guiderail 8.

A coil portion 34a of the coil spring 34 is also fitted onto the shaft 33. One of arm portions 34b of the coil spring 34 is contacted to the rod 32 and the other arm portion 34c of the coil spring 34 is contacted to a stopper 36 formed on the casing 7 so that the coil spring 34 is compressed inwardly. That is, an elastic force of the coil spring 34 is applied to the rod 32 by the arm portion 21b to push the rod 32 counterclockwise.

For example, a hydraulic actuator comprises a hydraulic cylinder and a hydraulic valve may be used as the actuator 35. Alternatively, an electric actuator actuated by a motor or an electromagnetic actuator actuated by an electromagnetic force may also be used as the actuator 35. In any of the cases, the actuator 35 is actuated upon reception of a hydraulic command or an electric command transmitted when the chain belt 6 is broken to withdraw the stopper portion 35a from the leading end 32b of the rod 32.

According to the embodiment shown in FIGS. 5 and 6, specifically, the actuator 35 comprises a rod 35c, the stopper portion 35a attached to a leading end of the rod 35c, and a hydraulic cylinder 35b that reciprocates the rod 35c. The hydraulic cylinder 35b is hydraulically actuated to withdraw the rod 35c thereby disengaging the stopper portion 35a from the leading end 32b of the rod 32.

When the chain belt 6 is broken, hydraulic pressure in the primary pulley 3 and the secondary pulley 5 drops abruptly. According to the embodiment shown in FIGS. 5 and 6, therefore a predetermined level of hydraulic pressure is applied to the hydraulic cylinder 35b to withdraw the rod 35c when the hydraulic pressure in any of the primary pulley 3 and the secondary pulley 5 drops below a threshold level. Consequently, as illustrated in FIG. 6, the rod 35c of the actuator 35 is withdrawn to disengage the stopper portion 35a from the leading end 32b of the rod 32 so that the rod 32 is rotated counterclockwise by the elastic force of the coil spring 34 to rotate the first guiderail 8 clockwise. As a result, the first straight portion 6b of the broken chain belt 6 is inclined in the downshifting direction.

Thus, according to the embodiment shown in FIGS. 5 and 6, the first guiderail 8 is rotated when the chain belt 6 is broken by the actuator unit 31 in such a manner that the broken chain belt 6 is inclined in the downshifting direction. However, in the normal condition, the first guiderail 8 and the chain belt 6 are not subjected to a load to incline the chain belt 6 in the downshifting direction. According to the embodiment shown in FIGS. 5 and 6, therefore, a friction loss between the chain belt 6 and the first guiderail 8 can be reduced in the normal condition.

According to the embodiment shown in FIG. 7, the CVT 1 is provided with an actuator system 41 that rotates at least one of the first guiderail 8 and the second guiderail 9 to change an inclination of the chain belt 6 in the downshifting direction when the chain belt 6 is broken, and a controller 42 configured to determine a breakage of the chain belt 6 and to control the actuator system 41.

The actuator system 41 comprises a rod 43 as a rod member or a plate member, a shaft 44, a torsion coil spring 45, and an actuator 46. A shaft hole 43a is formed on one end of the rod 43 (in the right side in FIG. 7), and the shaft hole 43a is fitted onto the shaft 44 fixed to the casing 7. Thus, the rod 43 is supported by the casing 7 in a pivotal manner so that a leading end 43b (in the left side in FIG. 7) of the rod 43 is to be brought into contact with the first guiderail 8 when the rod 43 is rotated counterclockwise. In the normal condition, such counterclock rotation of the rod 43 is restricted by a stopper portion 46a of the actuator 46 that is contacted to the leading end 43b of the rod 43. That is, in the normal condition, the leading end 43b of the rod 43 is isolated from the first guiderail 8.

A coil portion 45a of the coil spring 45 is also fitted onto the shaft 44. One of arm portions 45b of the coil spring 45 is contacted to the rod 43 and the other arm portion 45c of the coil spring 45 is contacted to a stopper 47 formed on the casing 7 so that the coil spring 45 is compressed inwardly. That is, an elastic force of the coil spring 45 is applied to the rod 43 by the arm portion 45b to push the rod 43 counterclockwise.

For example, a hydraulic actuator comprising a hydraulic cylinder and a hydraulic valve may be used as the actuator 46. Alternatively, an electric actuator actuated by a motor or an electromagnetic actuator actuated by an electromagnetic force may also be used as the actuator 46. In any of the cases, the actuator 46 is actuated upon reception of a hydraulic command or an electric command transmitted when the chain belt 6 is broken to withdraw the stopper portion 46a from the leading end 43b of the rod 43.

According to the embodiment shown in FIG. 7, specifically, the actuator 46 comprises a rod 46c, the stopper portion 46a attached to a leading end of the rod 46c, and a solenoid 46b that reciprocates the rod 46c. When the solenoid 46b is energized, the rod 46c is magnetically withdrawn toward the solenoid 46b so that the stopper portion 46a is disengaged from the leading end 43b of the rod 43.

The controller (referred to as "ECU" in FIG. 7) 42 is an electronic control unit composed mainly of microcomputer, and the actuator system 41 is connected to the controller 42. Specifically, an electricity of a predetermined voltage is supplied to the actuator system 41 from a power source (not shown) upon reception of a control signal from the controller 42. Consequently, the rod 46c is withdrawn by the solenoid 46b to disengage the stopper portion 46a from the leading end 43b of the rod 43 thereby allowing the rod 43 to rotate counterclockwise.

For example, a first hydraulic sensor 48 for detecting a hydraulic pressure applied to an actuator of the primary pulley 3, a second hydraulic sensor 49 for detecting a hydraulic pressure applied to an actuator of the secondary pulley 5, a position sensor and a speed sensor (neither of which are shown) are connected to the controller 42. The controller 42 carries out a calculation based on detection signals transmitted from those sensors, and transmits a calculation result in the form of command signal. According to the embodiment shown in FIG. 7, the controller 42 determines a breakage of the chain belt 6 based on the detection signals from the hydraulic sensors 48 and 49. Specifically, if at least one of the hydraulic pressures detected by the hydraulic sensors 48 and 49 is lower than a threshold level, the controller 42 determines that the chain belt 6 is broken. In this case, the controller 42 transmits a command signal to actuate the actuator system 41.

Consequently, the actuator 46 is actuated to withdraw the stopper portion 46a from the leading end 43b of the rod 43 so that the rod 43 is allowed to rotate counterclockwise. As a result, the first guiderail 8 is rotated clockwise by the leading end 43b of the rod 43 to incline the first straight portion 6a of the broken chain belt 6 in the downshifting direction.

According to the embodiment shown in FIG. 7, a breakage of the chain belt 6 can be detected accurately by the controller 42. If the controller 42 determines that the chain belt 6 is broken, the first guiderail 8 is rotated by the actuator system 41 in such a manner that the broken chain belt 6 is inclined in the downshifting direction. However, in the normal condition, the first guiderail 8 and the chain belt 6 are not subjected to a load to incline the chain belt 6 in the downshifting direction. According to the embodiment shown in FIG. 7, therefore, a friction loss between the chain belt 6 and the first guiderail 8 can be reduced in the normal condition.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A belt-driven continuously variable transmission, in which a speed ratio is varied by changing a width of a belt groove of at least one of a primary pulley and a secondary pulley thereby altering running radii of a chain belt applied to the belt grooves of the primary pulley and the secondary pulley to transmit power therebetween, comprising:
    a guiderail that is contacted to a straight portion of the chain belt running between the primary pulley and the secondary pulley to suppress vibrations in the chain belt and that is allowed to rotate with a change in an inclination of the straight portion of the chain belt; and
    a pushing mechanism that applies a load to the guiderail to rotate the guiderail to alter an inclination of the straight portion of the chain belt in a direction to increase the speed ratio when the chain belt is broken.

2. The belt-driven continuously variable transmission as claimed in claim 1, wherein the pushing mechanism includes a spring member that applies an elastic force to the guiderail to rotate the guiderail to alter an inclination of the straight portion of the chain belt in a direction to increase the speed ratio.

3. The belt-driven continuously variable transmission as claimed in claim 2,
    wherein the straight portion includes a first straight portion and a second straight portion,
    wherein a tension in the first straight portion is higher than that in the second straight portion, and
    wherein the spring member applies an elastic force to the guiderail contacted to the first straight portion.

4. The belt-driven continuously variable transmission as claimed in claim 2,
    wherein the straight portion includes a first straight portion and a second straight portion,
    wherein a tension in the first straight portion is higher than that in the second straight portion, and
    wherein the spring member applies an elastic force to the guiderail contacted to the second straight portion.

5. The belt-driven continuously variable transmission as claimed in claim 2,
    wherein the straight portion includes a first straight portion and a second straight portion,
    wherein a tension in the first straight portion is higher than that in the second straight portion, and
    wherein the spring member is individually contacted to the guiderail contacted to the first straight portion and the guiderail contacted to the second straight portion to apply an elastic force to each of the guiderail.

6. The belt-driven continuously variable transmission as claimed in claim 1, wherein the pushing mechanism includes an actuator unit that rotates the guiderail to alter an inclination of the straight portion of the chain belt in a downshifting direction to increase the speed ratio when the chain belt is broken.

7. The belt-driven continuously variable transmission as claimed in claim 1,
    wherein the pushing mechanism includes an actuator system that rotates the guiderail to alter an inclination of the straight portion of the chain belt in a downshifting direction to increase the speed ratio, and a controller that determines a breakage of the chain belt and controls the actuator system, and
    wherein the controller is configured to actuate the actuator system to rotate the guiderail to alter an inclination of the straight portion of the chain belt in a direction to increase the speed ratio when the chain belt is broken.

8. The belt-driven continuously variable transmission as claimed in claim 6,
    wherein the straight portion includes a first straight portion and a second straight portion,
    wherein a tension in the first straight portion is higher than that in the second straight portion, and
    wherein the actuator unit and the actuator system are adapted to rotate the guiderail contacted to the first straight portion in a downshifting direction to increase the speed ratio.

9. The belt-driven continuously variable transmission as claimed in claim 7,
    wherein the straight portion includes a first straight portion and a second straight portion,
    wherein a tension in the first straight portion is higher than that in the second straight portion, and
    wherein the actuator unit and the actuator system are adapted to rotate the guiderail contacted to the first straight portion in a downshifting direction to increase the speed ratio.

* * * * *